US011371447B2

(12) United States Patent
Kiwan et al.

(10) Patent No.: US 11,371,447 B2
(45) Date of Patent: Jun. 28, 2022

(54) METHOD AND SYSTEM FOR LEARNING CONTRIBUTIONS TO AN ENGINE KNOCK BACKGROUND NOISE LEVEL

(71) Applicant: Ford Global Technologies, LLC, Dearborn, MI (US)

(72) Inventors: Rani Kiwan, Canton, MI (US); Christopher P. Glugla, Macomb, MI (US); Mohannad Hakeem, Dearborn, MI (US); James M. Kindree, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/003,678

(22) Filed: Aug. 26, 2020

(65) Prior Publication Data

US 2021/0115860 A1 Apr. 22, 2021

Related U.S. Application Data

(62) Division of application No. 16/122,065, filed on Sep. 5, 2018, now Pat. No. 10,830,163.

(51) Int. Cl.
| | |
|---|---|
| *F02D 35/00* | (2006.01) |
| *F02D 35/02* | (2006.01) |
| *G01M 15/12* | (2006.01) |
| *G01L 23/22* | (2006.01) |
| *F02D 37/02* | (2006.01) |

(52) U.S. Cl.
CPC .......... *F02D 35/027* (2013.01); *G01L 23/221* (2013.01); *G01M 15/12* (2013.01); *F02D 37/02* (2013.01)

(58) Field of Classification Search
CPC .. F02D 41/3094; F02D 35/027; G01M 15/12; G01L 23/221
See application file for complete search history.

(56) References Cited

U.S. PATENT DOCUMENTS

| | | | |
|---|---|---|---|
| 7,152,574 B2 * | 12/2006 | Mashiki | F02D 35/027 123/304 |
| 9,759,145 B2 | 9/2017 | Glugla et al. | |
| 9,777,658 B2 | 10/2017 | Nagashima et al. | |
| 10,683,387 B2 | 6/2020 | Johnson et al. | |
| 10,746,153 B2 | 8/2020 | Hakeem et al. | |
| 10,753,290 B2 | 8/2020 | Glugla et al. | |
| 10,774,770 B2 * | 9/2020 | Kiwan | F02D 41/0025 |
| 2004/0149263 A1 * | 8/2004 | Tanei | F02D 35/027 123/406.29 |
| 2005/0098156 A1 * | 5/2005 | Ohtani | F02M 69/046 123/431 |
| 2006/0021422 A1 * | 2/2006 | Demura | F02D 41/3094 73/35.01 |
| 2006/0144365 A1 * | 7/2006 | Miyashita | F02D 35/027 123/431 |

(Continued)

*Primary Examiner* — Phutthiwat Wongwian
*Assistant Examiner* — Sherman D Manley
(74) *Attorney, Agent, or Firm* — Vincent Mastrogiacomo; McCoy Russell LLP

(57) ABSTRACT

Methods and systems are disclosed for operating an engine that includes a knock control system that may determine contributions of individual noise sources to an engine background noise level. The contributions of the individual noise sources may be the basis for establishing the presence or absence of knock in one or more engine cylinders.

9 Claims, 7 Drawing Sheets

(56) References Cited

U.S. PATENT DOCUMENTS

| | | | |
|---|---|---|---|
| 2008/0060615 A1* | 3/2008 | Christman | F02P 5/152 |
| | | | 123/406.16 |
| 2010/0037859 A1* | 2/2010 | Mashiki | F02D 35/027 |
| | | | 123/436 |
| 2011/0132327 A1* | 6/2011 | Aso | F02D 13/0215 |
| | | | 123/436 |
| 2014/0350823 A1* | 11/2014 | Glugla | F02P 5/1522 |
| | | | 701/104 |
| 2016/0115878 A1 | 4/2016 | VanDerWege | |
| 2017/0356355 A1* | 12/2017 | Rollinger | F02B 37/16 |
| 2017/0356366 A1* | 12/2017 | Glugla | F02P 5/045 |
| 2019/0343131 A1 | 11/2019 | McCarty, Jr. et al. | |
| 2019/0353133 A1* | 11/2019 | Hakeem | F02P 5/1521 |
| 2020/0080502 A1 | 3/2020 | Glugla et al. | |
| 2020/0131988 A1 | 4/2020 | Kiwan et al. | |

* cited by examiner

ND SYSTEM FOR LEARNING
CONTRIBUTIONS TO AN ENGINE KNOCK
BACKGROUND NOISE LEVEL

CROSS REFERENCE TO RELATED APPLICATIONS

The present application is a divisional of U.S. Non-Provisional patent application Ser. No. 16/122,065, entitled "METHOD AND SYSTEM FOR LEARNING CONTRIBUTIONS TO AN ENGINE KNOCK BACKGROUND NOISE LEVEL," filed on Sep. 5, 2018. The entire contents of the above-referenced applications are hereby incorporated by reference in its entirety for all purposes.

FIELD

The present application relates to methods and systems for learning and establishing contributions of different engine noise sources to an engine knock background noise level.

BACKGROUND/SUMMARY

Output of a vibration sensor may be the basis for establishing the presence or absence of engine knock. Engine knock may be produced by gases igniting in a cylinder before a flame front produced via a spark plug reaches the gases. The gases may ignite as pressure and temperature in the cylinder rises after combustion in the cylinder is initiated during a cycle of the cylinder. High frequency pressure oscillations within the cylinder may generate an engine knocking sound that may be captured by the vibration sensor. Engine knock may cause degradation within the cylinder. Therefore, it may be desirable to reliably sense the presence of knock via the vibration sensor so that actions to mitigate engine knock may be performed.

One way to detect engine knock via the vibration sensor is to divide an integrated knock sensor output value determined from output of a knock sensor during a knock window (e.g., a crankshaft angular interval) by a value of an integrated engine knock background noise level that may be observed during the knock window or during a knock window of an earlier cycle of the cylinder. This operation provides an engine knock intensity level or value. If the result of the division (the knock intensity value) exceeds a threshold value, it may be determined that engine knock is present. If the result of the division is less than the threshold value, then it may be determined that engine knock is not present.

This method may be the basis for reliably detecting engine knock, but changes in engine operating conditions may change the engine's background noise level so that actual engine knock may not be detected because of high levels of engine background noise. Similarly, false indications of engine knock may be generated if the engine background noise level is reduced as a result of changes in engine operating conditions. Therefore, it may be desirable to provide a way of learning engine knock background noise levels so that knock intensity values may be closely related to present engine operating conditions, thereby improving confidence in knock intensity values.

The inventors herein have developed an engine operating method, comprising: retarding spark timing of a first cylinder via a controller in response to a request to learn an engine knock background noise level; and deactivating a direct fuel injector and activating a port fuel injector of a second cylinder via the controller in response to the request to learn the engine knock background noise level.

By retarding spark timing of an engine cylinder, it may be possible to learn engine knock background noise levels during a wide variety of engine operating conditions so that the engine knock background noise levels may be revised to compensate for present engine operating conditions. For example, spark timing of an engine cylinder may be retarded so that the possibility of knock within the cylinder is significantly reduced. Once the spark timing is adjusted, a direct fuel injector that opens or closes during a knock window associated with the cylinder may be deactivated or its opening or closing time may be adjusted so that a base engine background noise level may be established at various times in the engine's life cycle. The revised or learned base engine background noise level may then be the basis for determining a knock intensity level of the cylinder or of a different cylinder. Thus, the base engine background noise level and contributions to an aggregated engine background noise levels may be learned and established to compensate for engine noise level changes that may occur as the engine ages.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
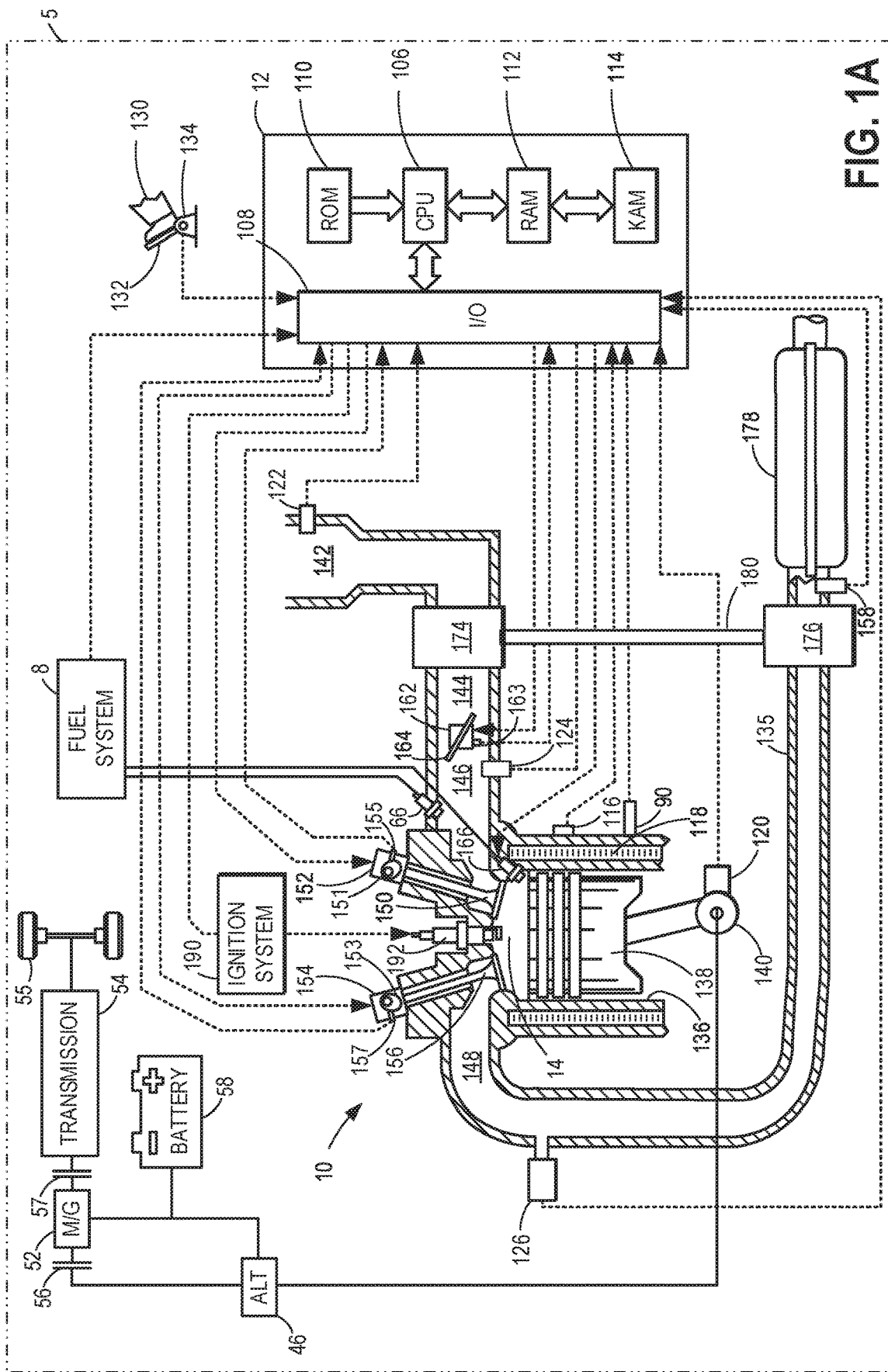
FIG. 1A shows a schematic depiction of an engine system of a vehicle.
Figure 1C:
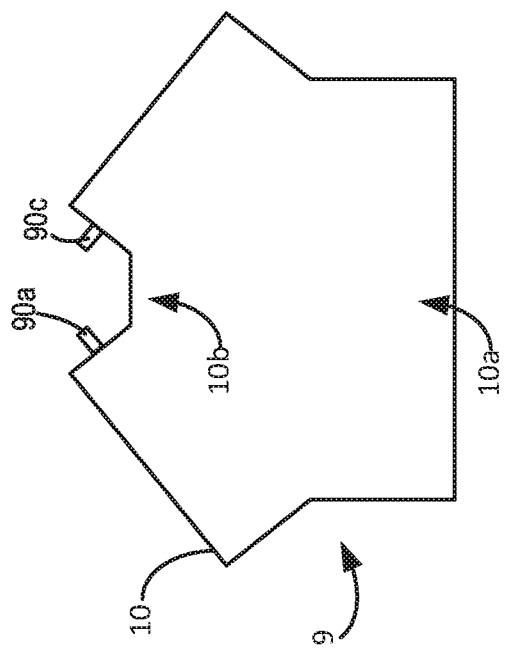
FIG. 1C shows an alternative view of knock sensor locations for the V8 engine.
Figure 1B:
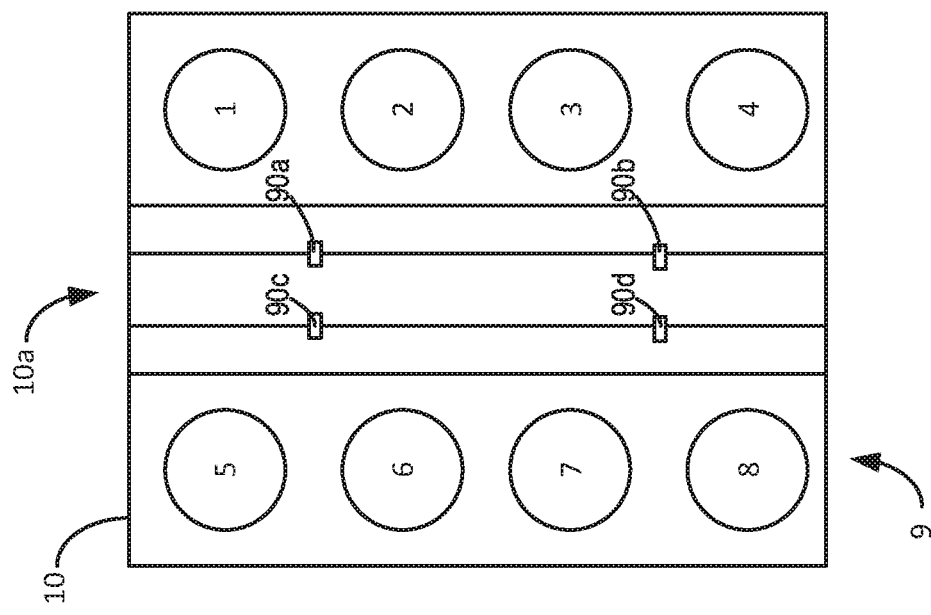
FIG. 1B shows example locations for knock sensors for a V8 engine.

The following description relates to systems and methods for operating an engine that includes a knock control system. The engine may be of the type that is shown in FIGS. 1A-1C. The engine may be operated according to the method of FIG. 2. The method may learn engine background noise levels for various operating conditions throughout the engine's life so that the possibility of accurately determining the presence of engine knock may be improved. The method may operate as shown in the sequences of FIGS. 3-6.

Turning now to the figures, FIG. 1A depicts an example of a cylinder 14 of an internal combustion engine 10, which may be included in a vehicle 5. Engine 10 may be controlled at least partially by a control system, including a controller 12, and by input from a human vehicle operator 130 via an input device 132. In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1A shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1A, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1A, exhaust gas sensor 126 is a UEGO sensor. Emission control device 178 may be a three-way catalyst, a NOx trap, various other emission control devices, or combinations thereof. In the example of FIG. 1A, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1A shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1A as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations (e.g., caused by knock) via vibration sensing knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1A and employs the various actuators of FIG. 1A to adjust engine operation based on the received signals and instructions stored on a memory of the controller. For example, the controller may transition the engine to operating in VDE mode by actuating valve actuators 152 and 154 to deactivate selected cylinders, as further described with respect to FIG. 5.

As described above, FIG. 1A shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1A with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Referring now to FIG. 1B, a plan view of engine 10 is shown. Front 10a of engine 10 may include a front end accessory drive (FEAD) (not shown) to provide power to an alternator, power steering system, and air conditioning compressor. In this example, engine 10 is shown in a V8 configuration with eight cylinders that are numbered 1-8. Engine knock may be sensed via four knock sensors 90a-90d. The knock sensors are positioned in the valley of engine block 9. In this example, output of knock sensor 90a is sampled via controller 12 during the knock windows (e.g., crankshaft angular intervals) of engine cylinders 1 and 2. Output of knock sensor 90b is sampled via controller 12 during the knock windows of engine cylinders 3 and 4. Output of knock sensor 90c is sampled via controller 12 during the knock windows of engine cylinders 5 and 6. Output of knock sensor 90d is sampled via controller 12 during the knock windows of engine cylinders 7 and 8. The plurality of knock sensors improves the ability to detect knock for each cylinder since attenuation of engine vibrations from knock increases as the distance from the knocking cylinder to the knock sensor increases. Knock sensor output is not sampled when the knock windows are closed.

Referring now to FIG. 1C, a front view of engine 10 is shown. Engine block 9 includes a valley 10b where engine knock sensors 90a and 90c are mounted to block 9. By mounting knock sensors 90a and 90c in the valley 10b, a good signal to noise ratio may be available so that knock may be more reliably detected. However, the mounting locations of knock sensors 90a-90d may also allow some fuel injector control actions to be observed by some sensors and not by others. Thus, background noise levels of some cylinders may be higher or lower than other cylinders. Additionally, the distance of a fuel injector that opens or closes near a knock window of another engine cylinder may affect an amount of time that it takes for a vibration to travel from the operating fuel injector to the knock sensor. And, a longer time for the vibration to travel from the fuel injector to the knock sensor may allow the vibration to enter a knock window for a cylinder. As such, knock sensor location, firing order, and engine configuration may also affect engine knock background noise levels for some engine cylinders.

Thus, the system of FIGS. 1A-1C provides for a system for operating an engine, comprising: an engine including at least one vibration sensing engine knock sensor; and a controller including executable instructions stored in non-transitory memory to retard spark timing of at least one engine cylinder and deactivate a direct fuel injector in response to a request to learn a base engine knock background noise level. The system further comprises additional instructions to learn the base engine knock background noise level via integrating output of the at least one vibration sensing engine knock sensor during a predetermined crankshaft interval. The system further comprises additional instructions to adjust a poppet valve timing of a cylinder other than the at least one cylinder via the controller in response to the request to learn the base engine knock background noise level. The system further comprises additional instructions to activate a port fuel injector in response to the request to learn the base engine knock background noise level. The system further comprises additional instructions to store the base engine knock background noise level to controller memory and determine a knock intensity of a cylinder other than the at least one engine cylinder based on the base engine knock background noise level.

Figure 2:
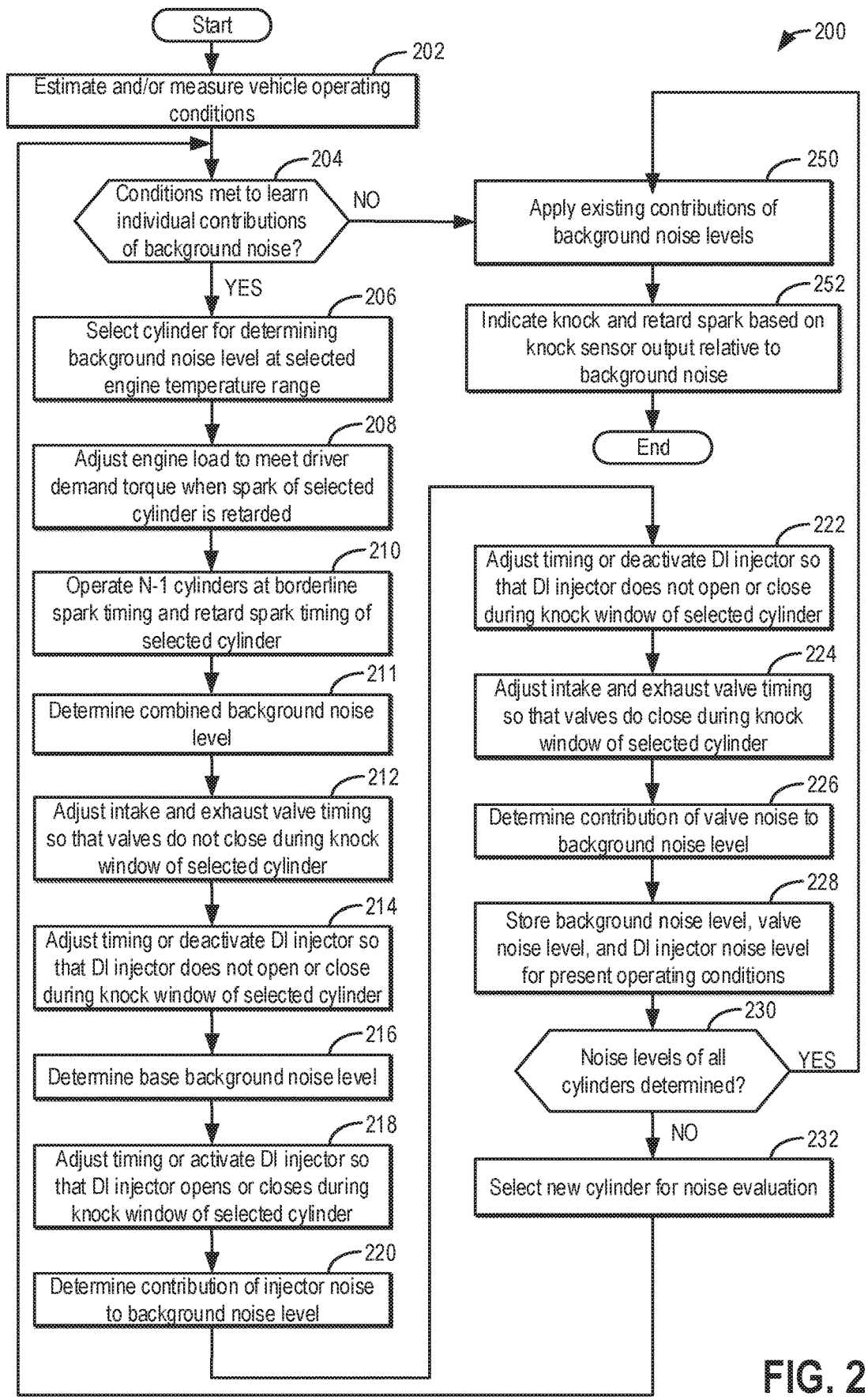
FIG. 2 shows a high level flow chart of a way to operate an engine that includes a knock control system.

Referring now to FIG. 2, a method for operating an engine is shown. The method of FIG. 2 may be included in and may cooperate with the system of FIGS. 1A-1C. At least portions of method 200 may be incorporated in the system of FIGS. 1A-1C as executable instructions stored in non-transitory memory. In addition, other portions of method 200 may be performed via a controller transforming operating states of devices and actuators in the physical world. The controller may employ engine actuators of the engine system to adjust engine operation. Further, method 200 may determine selected control parameters from sensor inputs.

At 202, method 200 determines vehicle and engine operating conditions via the sensors described in FIGS. 1A-1C. Method 200 may determine operating conditions including but not limited to engine speed, engine load, engine temperature, ambient temperature, fuel injection timing, knock sensor output, fuel type, fuel octane, engine position, and engine air flow. Method 200 proceeds to 204.

At 204, method 200 judges if conditions are met for learning contributions of noise to engine knock background noise levels. In one example, conditions are met when engine speed is within a specified range (e.g., engine speed greater than a first threshold speed and less than a second threshold speed), when engine load is within a specified range (e.g., engine load greater than a first threshold load and less than a second threshold load), the engine has been operating for a predetermined total amount of time since being manufactured, and engine temperature is greater than a threshold temperature. If method 200 judges that conditions are met for learning contributions of noise (e.g., fuel injector opening and closing, poppet valve opening and closing, etc.) to engine knock background noise levels, the answer is yes and method 200 proceeds to 206. Otherwise, the answer is no and method 200 proceeds to 250.

At 250, method 200 applies existing contributions of noise to establish or determine engine knock background noise levels. In one example, the engine background noise level may be determined via the following equation:

$$Cyl\_bkg\_noise(i) = Cyl\_base\_noise(i) + Cyl\_inj\_noise(i) + Cyl\_vlv\_noise(i)$$

where Cyl_bkg_noise(i) is the total cylinder background noise level for cylinder i at the present engine speed and load, Cyl_base_noise (i) is a base cylinder background noise level that does not include noise from fuel injectors and/or intake and/or exhaust poppet valves that open and/or close during a knock window of cylinder (i), Cyl_inj_noise (i) is a fuel injector noise that occurs during a knock window of cylinder (i), and Cyl_vlv_noise (i) is noise from intake/exhaust valves that open and/or close during a knock window of cylinder (i), and where i is the number (e.g., 1-8 for an eight cylinder engine) of the cylinder which is presently being evaluated for the presence or absence of knock. It should be noted that noise of cylinders other than the present cylinder i may be applied or used in place of noise from cylinder i when the noise level of another cylinder is representative of the noise of cylinder i or when the noise level for cylinder i is not available and the noise level of another cylinder is available. For example, Cyl_bkg_noise (i) may be equal to Cyl_base_noise (i−1)+Cyl_inj_noise (i+2)+Cyl_vlv_noise (i+2). Thus, in this example, the total cylinder background noise for cylinder i may be equal to the base cylinder background noise level for cylinder i−1 plus the cylinder background fuel injector noise for cylinder i+2 plus the cylinder background valve noise for cylinder i+2. Method 200 proceeds to 252 after determining the background noise level for cylinder i. The value of i may change based on which cylinder background noise levels are being learned.

At 252, method 200 evaluates a present cylinder i for the presence or absence of engine knock. The value of i may be changed (e.g., from 1-8) so that all engine cylinders may be assessed for the presence of engine knock each engine cycle (e.g., two revolutions for a four stroke engine). Method 200 assesses whether or not engine knock should be indicated for a particular cylinder based on the engine knock background noise levels determined at 250. In one example, method 200 computes a knock intensity value for a particular cylinder by integrating output of the knock sensor during the knock window of the particular cylinder (e.g., a particular engine crankshaft angular interval) and dividing the integrated knock sensor output by the integrated engine knock background noise level for the particular cylinder. If the engine knock intensity value exceeds a threshold value, then engine knock is indicated for the particular cylinder and spark timing for the particular cylinder is retarded by a predetermined amount. The spark is retarded for the particular cylinder and then the spark timing is advanced back toward the MBT (minimum spark advance for best engine torque) spark timing. For example, if the engine knock intensity value for cylinder number one exceeds a threshold level, then knock is indicated for cylinder number one and spark timing of cylinder number one is retarded by five crankshaft degrees. The spark timing for cylinder number one may be advanced by five crankshaft degrees within ten seconds of when the spark timing of cylinder number one was retarded based on the determination of knock in cylinder number one. If knock is not indicated, spark timing for the cylinder remains at its requested or base timing (e.g., MBT timing or knock limited spark timing). Knock for each engine cylinder may be determined in this way.

At 206, method 200 selects the cylinder for which the cylinder's background noise levels are to be learned and updated. In one example, the selected cylinder is the cylinder for which it is desired to adjust an engine knock background noise level. For example, if it is desired to update or learn the engine knock background noise level for cylinder number one, then cylinder number one may be the selected cylinder. Logic for selecting the engine cylinder may be stored in controller memory. In one example, cylinder number one is first selected and then the selected cylinder (i) is incremented by a value of one until each cylinder has been selected and the engine knock background noise levels of each engine cylinder have been established. Method 200 proceeds to 208 after selecting the cylinder for knock evaluation.

At 208, method 200 adjusts engine load to meet driver demand torque when spark of the selected cylinder is retarded to reduce the possibility of engine knock. In one example, engine load may be increased by increasing air flow through the engine via opening the engine's throttle. Engine torque may be maintained to meet driver demand torque by increasing the engine load even though spark timing of the selected cylinder will be retarded at 210. Thus, engine load may be increased from 0.2 to 0.25 to meet driver demand torque when spark timing of the selected cylinder is retarded by 5 crankshaft degrees. In one example, a function that describes engine torque at a particular engine speed and load as a function of spark timing is the basis for determining the torque reduction that will occur for retarding spark of a cylinder by a predetermined amount (e.g., 5 crankshaft degrees). The engine torque at the present engine speed may be increased by the amount of engine torque reduction that is due to spark timing retard so that engine torque meets driver demand torque. A second function that relates engine load to engine speed and engine torque is the basis for adjusting engine load. For example, if retarding spark of the selected cylinder by 5 crankshaft degrees reduces engine torque by eight Newton-meters, then torque output of all engine cylinders may be increased to increase engine torque by eight Newton-meters via increasing the engine load by a value of 0.05 load, for example. Method 200 proceeds to 210 after adjusting the engine load to meet driver demand torque.

At 210, method 200 operates N−1 cylinders with knock limited spark timing (e.g., spark timing where engine knock begins to be observed) or MBT spark timing while the spark timing of the selected cylinder is retarded from knock limited spark timing or MBT spark timing, where N is the total actual number of engine cylinders. By retarding the spark timing of the selected cylinder, the possibility of knock in the selected cylinder may be significantly reduced so that an accurate estimate of background engine noise for the selected cylinder may be determined. In other words, the possibility that the engine background noise level of the selected cylinder will be influenced by knock in the selected cylinder is reduced. Further, by operating the engine with N−1 cylinders having borderline or MBT spark timing, engine efficiency may be maintained at a higher level. Method 200 proceeds to 211 after beginning to operate the selected cylinder with retarded spark timing.

At 211, method 200 determines a combined background noise level Cyl_combined_noise (i) for the selected cylinder. In one example, method 200 integrates output of a vibration sensor during a portion of the open knock window of the selected cylinder. The output of the vibration sensor may be integrated numerically or via an integrator circuit to determine the base background noise level of the selected cylinder. Method 200 stores the value of the combined background noise level to controller memory. The combined background noise level may include noise from injectors opening and/or closing during the open knock window and/or poppet valves opening and/or closing during the open knock window. The combined background noise level for a cylinder may be useful for determining the contributions of noise sources. The combined background noise may be expressed as Cyl_combined_noise (i)=Cyl_base_noise (i)+Cyl_inj_noise (i)+Cyl_vlv_noise (i). Accordingly, any one of the variables in the combined background noise equation may be solved knowing three of the other variables. For example, Cyl_base_noise (i)=Cyl_combined_noise (i)−Cyl_inj_noise (i)−Cyl_vlv_noise (i). Method 200 proceeds to 212.

At 212, method 200 adjusts intake and exhaust valve timing of one or more cylinders so that intake and/or exhaust valves do not close during the open engine knock window of the selected cylinder. Alternatively, or additionally, method 200 adjusts intake and exhaust valve timing of one or more cylinders so that intake and/or exhaust valves do not open during the open engine knock window of the selected cylinder. For example, if the selected cylinder is cylinder number one and the knock window of cylinder number one is open beginning at five crankshaft degrees after top-dead-center compression stroke of cylinder number one to thirty five crankshaft degrees after top-dead-center compression stroke of cylinder number one, then timing of intake and exhaust valves that close during the open knock window of cylinder number one are adjusted (e.g., advanced or retarded) so as to not close during the knock window of cylinder number one. Method 200 may also adjust intake and exhaust valve timing of one or more cylinders so that intake and/or exhaust valves do not open during the open engine knock window of the selected cylinder. Thus, intake and exhaust timing of cylinders that have poppet valves that open and/or close during the open knock window of the selected cylinder may be adjusted from a base timing of intake and exhaust valves so as to remove noise from intake and/or exhaust valves that open and/or close during the open knock window of the selected cylinder. By removing the intake and exhaust valve opening and closing noise from an open knock window of the selected cylinder, it may be possible determine a more accurate value of base engine background noise level. In addition, adjustments to throttle position may be made to maintain engine torque when poppet valve timings are adjusted. Method 200 proceeds to 214.

At 214, method 200 adjusts direct injection fuel injector timing of one or more cylinders so that DI fuel injectors are not opened or closed during the open engine knock window of the selected cylinder. For example, if the selected cylinder is cylinder number one and the knock window of cylinder number one is open beginning at five crankshaft degrees after top-dead-center compression stroke of cylinder number one to thirty five crankshaft degrees after top-dead-center compression stroke of cylinder number one, then timing of DI injectors that open and/or close during the open knock window of cylinder number one are adjusted (e.g., advanced or retarded). Adjusting the timing of the DI injector includes deactivating a DI injector and activating a port fuel injector so that noise from the DI injector does not enter the open knock window of the selected cylinder. Thus, DI injectors that open or close during the open knock window of the selected cylinder may be adjusted from a base timing of a DI injector so as to remove noise from DI injectors that open or close during the open knock window of the selected cylinder. By removing the DI injector noise from an open knock window of the selected cylinder, it may be possible determine a more accurate value of base engine background noise level. Method 200 proceeds to 216.

At 216, method 200 determines a base background noise level Cyl_base_noise (i) for the selected cylinder. In one example, method 200 integrates output of a vibration sensor during a portion of the open knock window of the selected cylinder. The output of the vibration sensor may be integrated numerically or via an integrator circuit to determine the base background noise level of the selected cylinder. Method 200 stores the value of the base background noise level to controller memory. Method 200 proceeds to 218 after determining and storing the base background noise level to controller memory.

At 218, method 200 adjusts direct injection fuel injector timing of one or more cylinders so that DI fuel injectors of all cylinders operate at their base timings or timings that provide similar noise levels in the knock window. Thus, one or more DI injectors may open or close during the open engine knock window of the selected cylinder. Adjusting the timing of the DI injector includes reactivating one or more DI injectors and deactivating one or more port fuel injectors so that noise from the DI injector that may enter the open knock window of the selected cylinder may be determined. By adding the DI injector noise to the open knock window of the selected cylinder, it may be possible determine the noise contribution of one or more DI injectors to the total engine background noise level. Method 200 proceeds to 220.

At 220, method 200 determines a DI injector background noise level Cyl_inj_noise (i) for the selected cylinder. In one example, method 200 integrates output of a vibration sensor during a portion of the open knock window of the selected cylinder and then the base background noise level determined at 216 is subtracted from the integrated value. The result is the contribution of DI injector noise to the total cylinder background noise level for the selected cylinder. The output of the vibration sensor may be integrated numerically or via an integrator circuit to determine the contribution of DI injector noise to the total cylinder background noise level for the selected cylinder. Method 200 stores the value of the contribution of DI injector noise to the total cylinder background noise level for the selected cylinder to controller memory. Method 200 proceeds to 222 after determining and storing the contribution of DI injector noise to the total cylinder background noise level for the selected cylinder to controller memory.

At 222, method 200 adjusts direct injection fuel injector timing of one or more cylinders so that DI fuel injectors are not opened or closed during the open engine knock window of the selected cylinder. Thus, DI injectors that open or close during the open knock window of the selected cylinder may be adjusted from a base timing of a DI injector so as to remove noise from DI injectors that open or close during the open knock window of the selected cylinder. By removing the DI injector noise from an open knock window of the selected cylinder, it may be possible to determine a more accurate value of noise from intake/exhaust valves that open and/or close during a knock window of the selected cylinder. Method 200 proceeds to 224.

At 224, method 200 adjusts intake and/or exhaust valve timing of one or more cylinders so that poppet valve opening and closings of all cylinders operate at their base timings. Thus, one or more poppet valves may open or close during the open engine knock window of the selected cylinder. By adding the poppet valve noise to the open knock window of the selected cylinder, it may be possible to determine the noise contribution of one or more intake and/or exhaust poppet valves to the total cylinder background noise level for the selected cylinder. Method 200 proceeds to 226.

At 226, method 200 determines a poppet valve background noise level Cyl_vlv_noise (i) for the selected cylinder. In one example, method 200 integrates output of a vibration sensor during a portion of the open knock window of the selected cylinder and then the base background noise level determined at 216 is subtracted from the integrated value. The result is the contribution of poppet valve noise to the total cylinder background noise level for the selected cylinder. The output of the vibration sensor may be integrated numerically or via an integrator circuit to determine the contribution of poppet valve noise to the total cylinder background noise level for the selected cylinder. Method 200 stores the value of the contribution of poppet valve noise to the total cylinder background noise level for the selected cylinder to controller memory. Method 200 proceeds to 228 after determining and storing the contribution of poppet valve noise to the total cylinder background noise level for the selected cylinder to controller memory.

At 228, method 200 stores values of Cyl_base_noise (i), Cyl_inj_noise (i), and Cyl_vlv_noise (i) to controller memory. The values may then be applied to determine the total cylinder background noise level for cylinder i and other engine cylinders at the present engine operating conditions. Method 200 proceeds to 230.

At 230, method 200 judges if noise levels (e.g., Cyl_base_noise (i), Cyl_inj_noise (i), and Cyl_vlv_noise (i)) for each engine cylinder at the present engine operating conditions have been determined or if previously learned noises do not need to be updated. If so, the answer is yes and method 200 proceeds to 250 where the noise levels are the basis for judging the presence of engine knock and mitigating engine knock. Otherwise, the answer is no and a different cylinder or same cylinder is made the selected cylinder. For example, the value of i may be incremented to select the next cylinder of the engine. Method 200 returns to 204 after a different cylinder is selected for engine knock background noise evaluation.

In this way, individual contributions of DI injector noise and poppet valve noise may be determined and applied to the same cylinder as is being evaluated or to other engine cylinders. The total engine background noise level may be a sum of the present individual contributions of noise.

Thus, the method of FIG. 2 provides for an engine operating method, comprising: retarding spark timing of a first cylinder via a controller in response to a request to learn an engine knock background noise level; and deactivating a direct fuel injector and activating a port fuel injector of a second cylinder via the controller in response to the request to learn the engine knock background noise level. The method further comprises increasing cylinder load and maintaining a driver demand torque in response to the request to learn the engine knock background noise level. The method includes where the cylinder load is increased via opening a throttle. The method further comprises maintaining spark timing in engine cylinders other than the first cylinder in response to the request to learn the engine knock background noise level. The method further comprises determining the engine knock background noise level via integrating output of a knock sensor that occurs during a predetermined crankshaft interval. The method further comprises determining an engine knock intensity level based on the engine knock background noise level. The method includes where the engine knock intensity level is determined for a cylinder other than the first cylinder.

The method of FIG. 2 also provides for an engine operating method, comprising: retarding spark timing of a first cylinder via a controller in response to a request to learn a base engine knock background noise level; and adjusting a poppet valve timing of a second cylinder via the controller in response to the request to learn the base engine knock background noise level. The method includes where the base engine knock background noise level does not include noise of a fuel injector that opens or closes during an engine knock window associated with the first cylinder. The method includes where the engine knock window is a predetermined engine crankshaft interval. The method includes where the base engine knock background noise level does not include noise of one or more poppet valves opening or closing during an engine knock window associated with the first cylinder. The method further comprises determining the base engine knock background noise level via integrating output of a knock sensor that occurs during a predetermined crankshaft interval after adjusting the poppet valve timing of the second cylinder via the controller in response to the request to learn the base engine knock background noise level.

In some examples, the method further comprises adjusting the poppet valve timing of a second cylinder to open or close a poppet valve of the second cylinder during an engine knock window associated with the first cylinder via the controller after learning the base engine knock background noise level. The method further comprises determining a poppet valve opening or closing noise contribution to an engine knock background noise level that includes the base engine knock background noise level. The method further comprises determining an engine knock intensity level for a cylinder other than the first cylinder based on the base engine knock background noise level.

Figure 3:
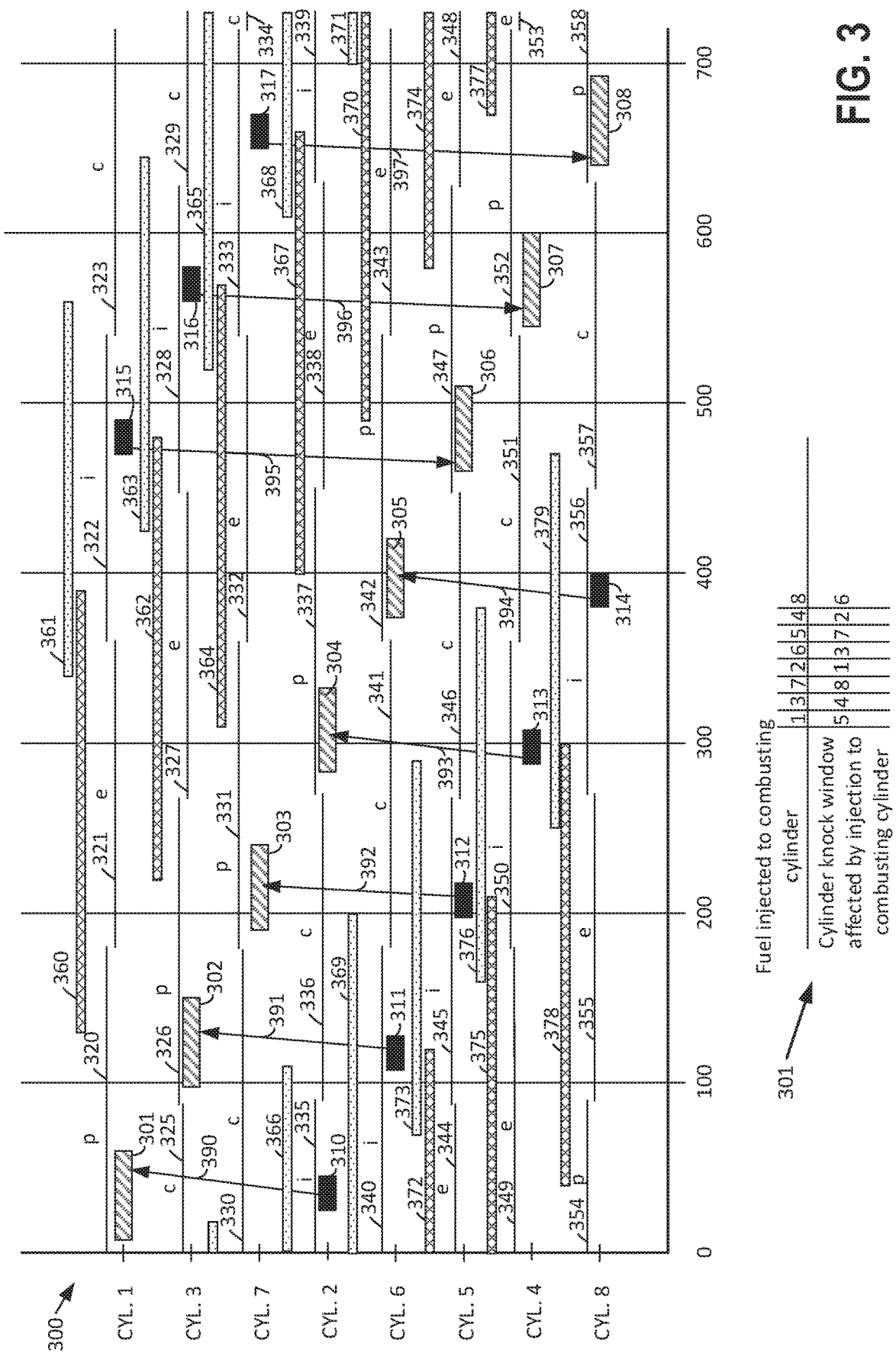
FIGS. 3-6 show example engine operating sequences for illustrating the method of FIG. 2.

Referring now to FIG. 3, a timing sequence 300 that illustrates example base engine knock window timing, direct injector timing, and intake and exhaust poppet valve opening and closing timing is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, several engine knock background noise influences are shown visually by DI injections and poppet valve timings.

The engine knock windows for each cylinder are positioned at a level of a tick mark along the vertical axis that is associated with the knock window. For example, the engine knock window for cylinder number one is indicated by slash bar 301. Knock windows for the remaining engine cylinders (2-8) are indicated by similar slash bars (302-308) that align with labeling along the vertical axis.

The engine fuel injection timings for each cylinder are positioned at a level the tick mark along the vertical axis that is associated with the fuel injection. For example, solid bar 310 represents a DI fuel injector open interval for cylinder number two. The DI fuel injector for cylinder number two is closed when solid bar 310 is not visible. The DI fuel injector for cylinder number two opens at the left side of solid bar 310 and closes at the right side of solid bar 310. DI fuel injections for the remaining engine cylinders (2-8) are indicated by similar solid bars (311-317) and they follow the same convention as solid bar 310. The fuel injector bars 310-317 respectively align with cylinders listed along the vertical axis that the fuel injector bars correspond to.

The strokes of a cylinder are positioned just above a level of the tick mark along the vertical axis that is associated with the stroke. For example, strokes for cylinder number one are indicated by horizontal lines 320-323. Letters p, e, i, and c identify the power (p), exhaust (e), intake (i), and compression (c) strokes associated with cylinder number one. Strokes for the other engine cylinders are identified in a similar way by lines 325-358.

The exhaust valve timings for each cylinder are positioned above a level of the tick mark along the vertical axis that is associated with the exhaust valve timings. For example, an exhaust valve opening time for cylinder number one is indicated by cross-hatched bar 360. The exhaust valves for cylinder number one are closed when no cross-hatched bar is present above the cylinder strokes of cylinder number one. Exhaust valve opening times for the other cylinders are indicated at 362, 364, 367, 370, 372, 374, 375, 377, and 378.

The intake valve timings for each cylinder are positioned above a level of the tick mark along the vertical axis that is associated with the intake valve timings. For example, an intake valve opening time for cylinder number one is indicated by dotted bar 361. The intake valves for cylinder number one are closed when no dotted bar is present above the cylinder strokes of cylinder number one. The intake valve opening times for the other cylinders are indicated at 363, 365, 366, 368, 369, 371, 373, 376, and 379.

FIG. 3 also includes table 301 that describes the relationship between DI fuel injection for one cylinder and engine knock background noise level for another cylinder as is illustrated in sequence 300. Table 301 includes a first label that indicates to which cylinder fuel is injected for combustion. The engine cylinder numbers arranged in the engine's firing order 1-3-7-2-6-5-4-8. The second label indicates the knock window of the cylinder that is affected by fuel injection to the cylinders combusting. Table 301 shows that the knock window of cylinder 5 is affected by fuel that is injected to combust in cylinder 1 (cylinder 1 is located above cylinder 5 in the table). Table 301 also shows that the knock window of cylinder 4 is affected by fuel that is injected to combust in cylinder 3, and so on. Thus, when fuel is directly injected to one cylinder, it may affect the engine knock background noise level of a cylinder that is three cylinders behind in the engine's order of combustion. Timings and interrelationships between port fuel injectors and cylinder knock windows may be described in a similar way. Arrows 390-397 show these relationships graphically. For example, the DI of fuel into cylinder number two at 310 may influence the engine noise observed in the knock window of cylinder number one at 301. Similarly, the DI of fuel into cylinder number six at 311 may influence the engine noise observed in the knock window of cylinder number three at 302, and so on.

The noise observed in a knock window of one cylinder may include noise related to events associated with other engine cylinders. For example, the engine knock window of cylinder number two indicated at 304 may occur at a time when the knock sensor is exposed to noise from the DI injection to cylinder number four at 313 and this linkage is shown via arrow 393. The relations between DI injections to other cylinders and the knock sensor output in other knock windows are illustrated via arrows 390-397. Thus, the engine knock background noise level determined for the engine knock window of cylinder number two shown at 304 may include noise generated by the DI injector opening and/or closing at 313. In addition, the intake valve closing of cylinder number five indicated by dotted bar 373 show that the intake valve of cylinder number five closes and may generate noise within the time that the knock window of cylinder number two is open as shown by bar 304. Further, the exhaust valve closing of cylinder number eight indicated by dotted bar 378 shows that the exhaust valve of cylinder number eight closes and may generate noise within the time that the knock window of cylinder number two is open as shown by bar 304. Further still, the exhaust valve opening of cylinder number seven indicated by bar 364 shows that the exhaust valve of cylinder number seven opens and may generate noise within the time that the knock window of cylinder number two is open as shown by bar 304. Thus, in this example, engine background noise as determined via the engine knock window for cylinder number two at 304 may include noise from DI event 313, valve event 373, valve event 364, and valve event 378.

The poppet valve and DI injection times shown in FIG. 3 may be indicative of base DI and poppet valve timings. These timings may affect the engine background noise levels determined from engine knock windows of the cylinders (e.g., 304). While it may be desirable to include all background noise sources to determine a background noise level for a particular cylinder, it may also be useful to decompose a total background noise level into the contributions from individual noise sources. By removing one or more noise influences from a total engine background noise level, it may be possible to determine engine noise levels that may be used to determine whether or not knock is present in other cylinders. For example, a base engine knock background noise level for cylinder number one may be used as a base engine knock background noise level for cylinder number three. Further, the poppet valve noise or DI injector noise of one cylinder may be applied to a different cylinder to estimate engine knock background noise for the different cylinder. Such allocations engine knock background noise levels may be useful when an engine knock background noise level has not been observed for a particular engine cylinder or if opportunities for learning engine knock background noise levels is limited by vehicle operating conditions.

Figure 4:
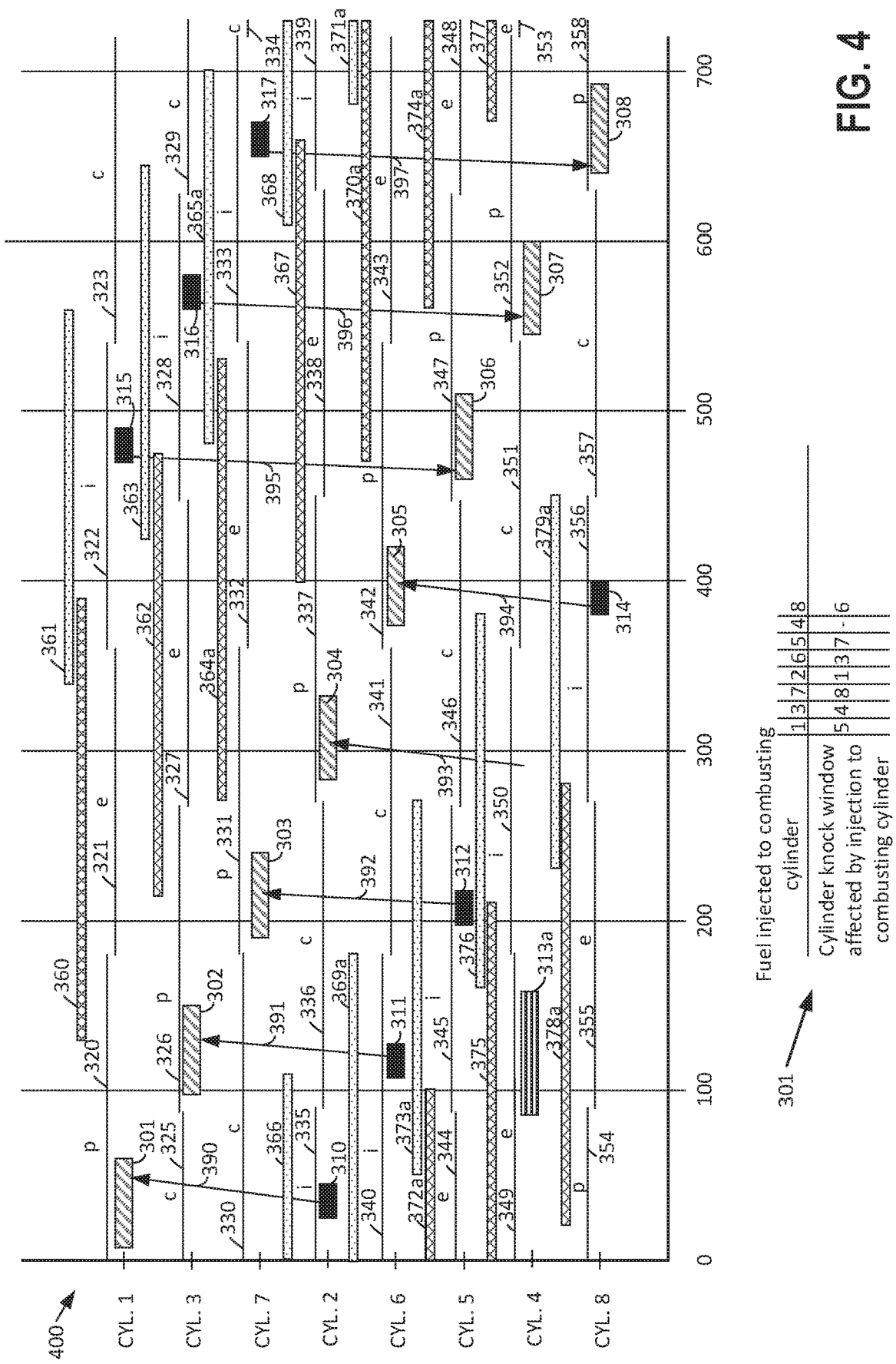

Referring now to FIG. 4, a timing sequence 400 that illustrates example base engine knock window timing for cylinder number two, direct injector closing removed from the knock window of cylinder number two, and intake and exhaust poppet valve openings and closings removed from the knock window of cylinder number two is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, several engine knock background noise influences have been removed from the engine knock window of cylinder number two to show how a base engine knock background noise level of cylinder number two may be determined and learned.

The fuel injections, valve timings, cylinder strokes, and engine position for each of the cylinders shown in FIG. 4 are identical to those shown in FIG. 3, except as noted below. Therefore, for the sake of brevity, the description of these items will not be repeated. Nevertheless, the timings and sequence shown in FIG. 4 is identical to that shown in FIG. 3, except as noted.

In this example, poppet valve closings and DI injector closings have been removed from the knock window of cylinder number two so that a base background noise level of cylinder number two may be established by integrating the output of an engine knock sensor during the engine knock window of cylinder number two. The engine knock window for cylinder number two during this engine cycle is indicated by bar 304.

DI injection at 313 has been prevented and a port fuel injection into cylinder number four has been introduced as indicated by bar 313a for the purpose of eliminating DI injector closing during the knock window of cylinder number two (e.g., 304) and maintaining torque production from cylinder number four. In addition, intake and exhaust valve timings of cylinders included in the second bank of cylinders (e.g., cylinders 5-8) are advanced so that the intake valve closing of cylinder number 5, the exhaust valve closing of cylinder number 8, and the exhaust valve opening of cylinder number seven do not occur within the time that the knock window of cylinder number two is open. Thus, valve timings 364a, 365a, 370a, 369a, 371a, 372a, 373a, 374a, 378a, and 379a are shown advanced from the positions of valve timings 364, 365, 370, 369, 371, 372, 373, 374, 378, and 379 shown in FIG. 3 for the purpose of reducing valve noise introduced into the knock window of cylinder number two (e.g., 304) so that an accurate base engine noise level may be learned and established in controller memory. Arrow 393 is still included to show the location of previous DI injections during cylinder cycles.

FIG. 4 also includes table 401, which is a revised version of table 301, that describes the relationship between DI fuel injection for one cylinder and engine knock background noise level for another cylinder as is illustrated in sequence 300. Table 401 does not include a cylinder knock window that is affected by fuel injection to cylinder number four since DI of fuel into cylinder number four has been eliminated. In addition, the port injection to cylinder number four does not open or close the port fuel injector while a knock window is open.

The base engine background noise level of cylinder number two may be determined via integrating output of a vibration based knock sensor during at portion of open knock window 304. This base engine background noise level may be applied to determine the presence of knock in cylinder number two or other engine cylinders. Further, this base engine background noise level does not include noise from DI injectors or poppet valves opening and closing while knock window 304 is open so that influence of injector and valve opening and closing may be reduced. The poppet valve and DI injection times shown in FIG. 4 may be indicative of DI and poppet valve timings modified for determining a base engine knock background noise level.

Figure 5:
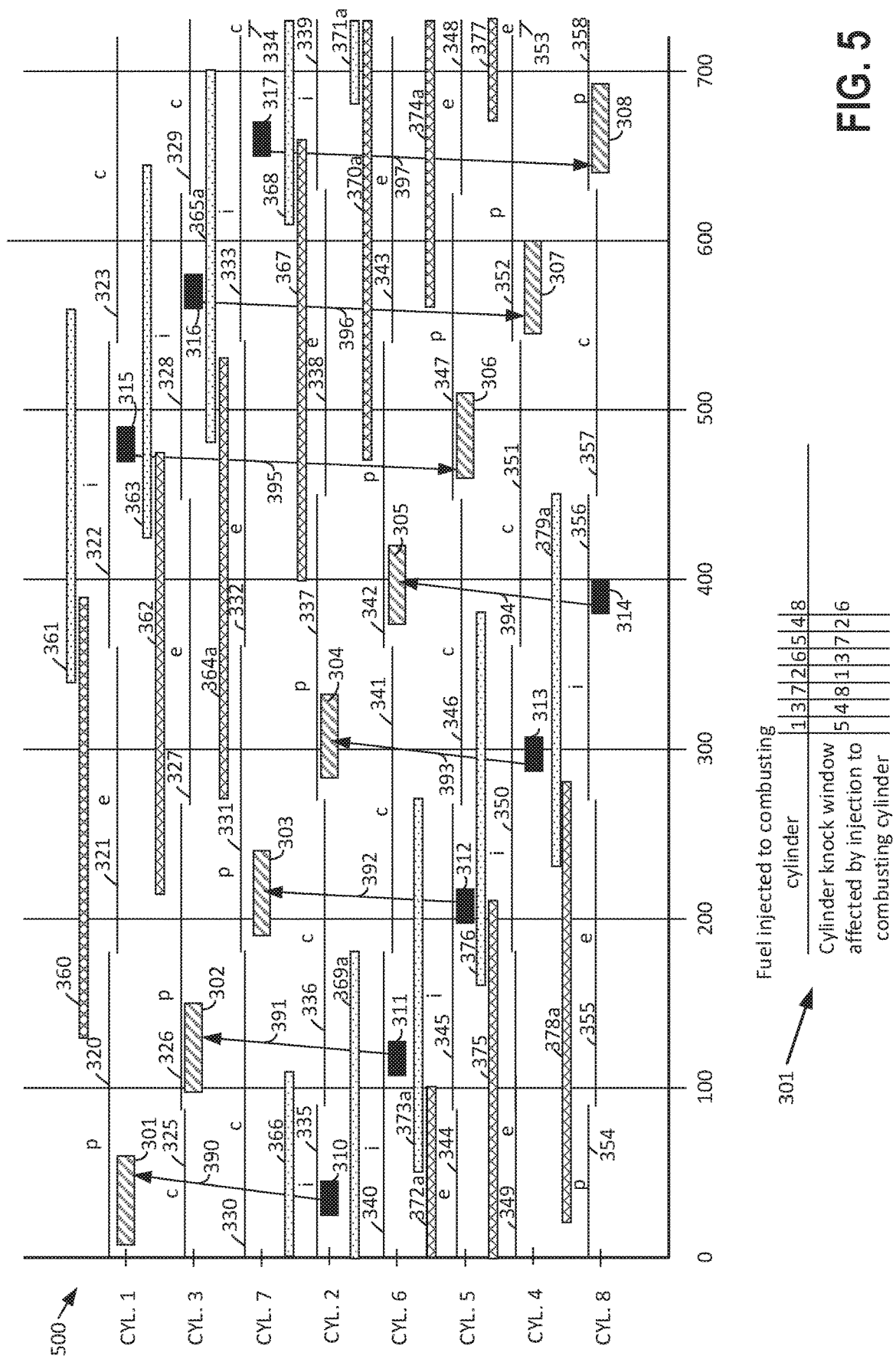

Referring now to FIG. 5, a timing sequence 500 that illustrates example base engine knock window timing for cylinder number two, base direct injector timing, and intake and exhaust poppet valve openings and closings removed from the knock window of cylinder number two is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, poppet valve opening and closing background noise influences have been removed from the engine knock window of cylinder number two to show how a contribution of DI noise to a total engine knock background noise level of cylinder number two may be determined and learned.

The fuel injections, valve timings, cylinder strokes, and engine position for each of the cylinders shown in FIG. 5 are identical to those shown in FIG. 3, except as noted below. Therefore, for the sake of brevity, the description of these items will not be repeated. Nevertheless, the timings and sequence shown in FIG. 5 is identical to that shown in FIG. 3, except as noted.

In this example, poppet valve closings have been removed from the knock window of cylinder number two so that a background noise level of cylinder number two that includes DI noise may be established by integrating the output of an engine knock sensor during the engine knock window of cylinder number two. The engine knock window for cylinder number two during this engine cycle is indicated by bar 304.

DI injection at 313 occurs as is shown in FIG. 3 and no port fuel injection into cylinder number four has been introduced for the purpose of evaluating DI injector closing during the knock window of cylinder number two (e.g., 304). In addition, intake and exhaust valve timings of cylinders included in the second bank of cylinders (e.g., cylinders 5-8) are advanced so that the intake valve closing of cylinder number five, the exhaust valve closing of cylinder number eight, and the exhaust valve opening of cylinder number seven do not occur within the time that the knock window of cylinder number two is open. Thus, valve timings 364a, 365a, 370a, 369a, 371a, 372a, 373a, 374a, 378a, and 379a are shown advanced from the positions of valve timings 364, 365, 370, 369, 371, 372, 373, 374, 378, and 379 shown in FIG. 3 for the purpose of reducing valve noise introduced into the knock window of cylinder number two (e.g., 304) so that an accurate DI noise level for cylinder number two may be learned and established in controller memory. FIG. 5 also includes table 301 since injection 313 is maintained from FIG. 3.

The contribution of DI noise to the total engine background noise level of cylinder number two may be determined via integrating output of a vibration based knock sensor during a portion of open knock window 304 and subtracting the base engine knock level. This DI noise level Cyl_inj_noise (i) may be applied to determine the presence of knock in cylinder number two or other engine cylinders. Further, this DI noise level does not include noise from poppet valves opening and closing while knock window 304 is open so that influence of poppet valve opening and closing may be reduced. The poppet valve and DI injection times shown in FIG. 5 may be indicative of poppet valve timings modified for determining a DI noise level.

Figure 6:
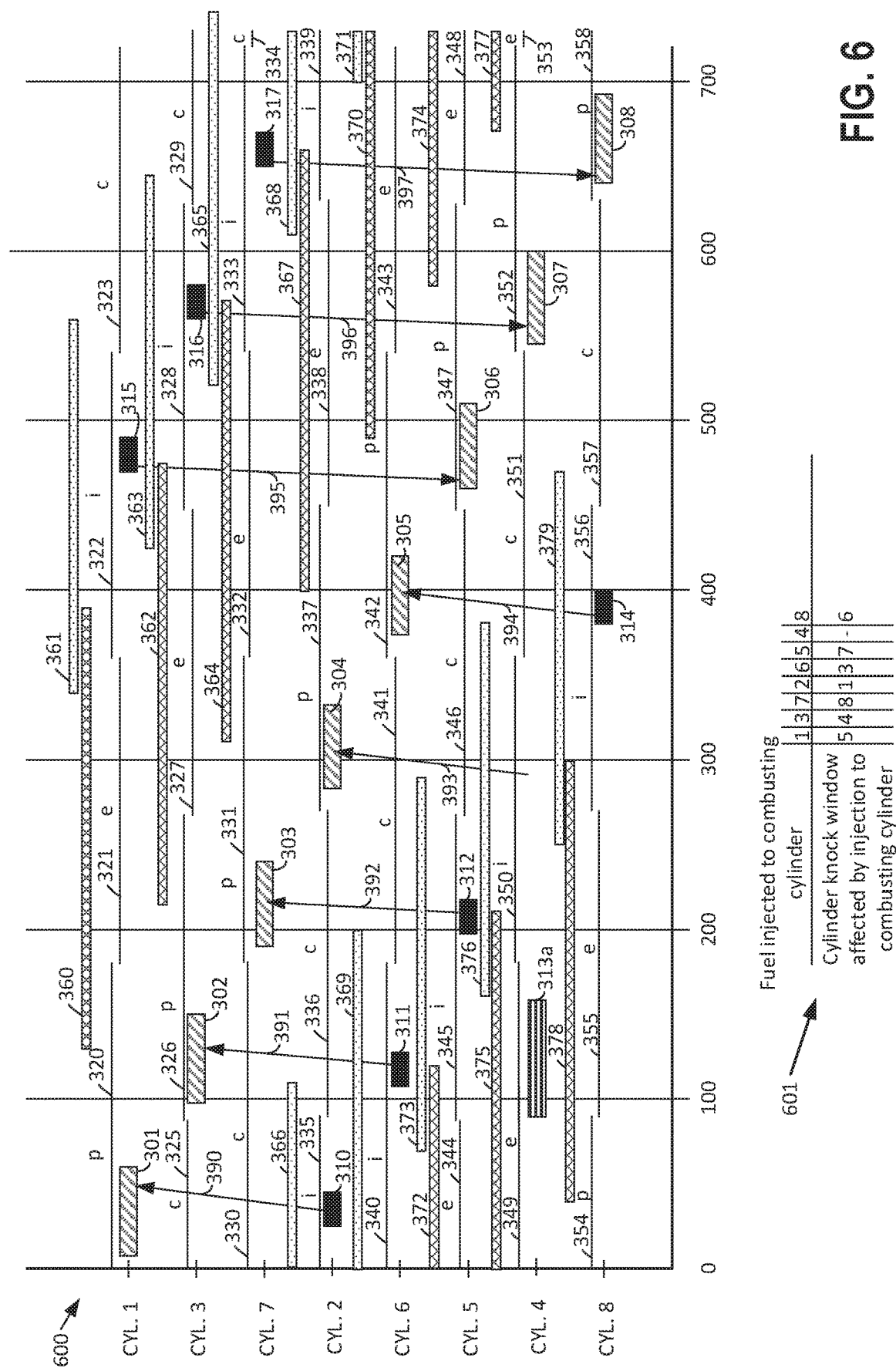

Referring now to FIG. 6, a timing sequence 600 that illustrates example base engine knock window timing, without direct injector timing, and base intake and exhaust poppet valve opening and closing timing is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, DI noise influences have been removed from the engine knock window of cylinder number two to show how a contribution of poppet valve noise to a total engine knock background noise level of cylinder number two may be determined and learned.

The fuel injections, valve timings, cylinder strokes, and engine position for each of the cylinders shown in FIG. 6 are identical to those shown in FIG. 3, except as noted below. Therefore, for the sake of brevity, the description of these items will not be repeated. Nevertheless, the timings and sequence shown in FIG. 6 is identical to that shown in FIG. 3, except as noted.

In this example, the DI injection 313 has been replaced by port injection 313a so that a background noise level of cylinder number two that includes poppet valve noise without DI noise may be established by integrating the output of an engine knock sensor during the engine knock window of cylinder number two. The engine knock window for cylinder number two during this engine cycle is indicated by bar 304. DI injection for cylinder number four has been eliminated and port fuel injection at 313a has been added so that noise from injection 313 is eliminated and so that cylinder number four continues to produce power. The intake and exhaust valve timings of cylinders included in the second bank of cylinders (e.g., cylinders 5-8) are at their base timings.

FIG. 6 also includes table 601, which is a revised version of table 301, that describes the relationship between DI fuel injection for one cylinder and engine knock background noise level for another cylinder as is illustrated in sequence 300. Table 601 does not include a cylinder knock window that is affected by fuel injection to cylinder number four since DI of fuel into cylinder four has been eliminated. In addition, the port injection 313a to cylinder number four does not open or close the port fuel injector while a knock window is open.

The contribution of poppet valve opening and closing noise during knock window 304 to the total engine background noise level of cylinder number two may be determined via integrating output of a vibration based knock sensor during at portion of open knock window 304 and subtracting the base engine knock level. This poppet valve noise level Cyl_vlv_noise (i) may be applied to determine the presence of knock in cylinder number two or other engine cylinders. Further, this poppet valve noise level does not include noise from a DI valve opening or closing while knock window 304 is open so that influence of DI injection may be reduced.

In this way, contributions of noise sources may be removed and introduced to a knock window of a cylinder to determine contributions of the individual noise sources to a total engine background noise level. The noise contributions and base background noise levels of a first cylinder may be applied to a second cylinder to determine the presence or absence of knock in the second cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
retarding a spark timing of a first cylinder via a controller in response to a request to learn a base engine knock background noise level; and
adjusting a poppet valve timing of a second cylinder via the controller in response to the request to learn the base engine knock background noise level, wherein the base engine knock background noise level does not include noise of a fuel injector that opens or closes during an engine knock window associated with the first cylinder, wherein the engine knock window is a predetermined engine crankshaft interval, and wherein a direct fuel injector opens or closes during an open engine knock window associated with the first cylinder.

2. The method of claim 1, wherein the base engine knock background noise level does not include noise of one or more poppet valves opening or closing during an engine knock window associated with the first cylinder.

3. The method of claim 1, further comprising determining the base engine knock background noise level via integrating output of a knock sensor that occurs during a predetermined crankshaft interval after adjusting the poppet valve timing of the second cylinder via the controller in response to the request to learn the base engine knock background noise level.

4. The method of claim 1, further comprising determining a direct injection fuel injector background noise level during an engine knock window associated with the first cylinder via the controller after learning the base engine knock background noise level.

5. The method of claim 4, wherein determining the direct injection fuel injector background noise level during the engine knock window associated with the first cylinder via the controller after learning the base engine knock background noise level comprises:
operating one or more direct injection fuel injectors during the engine knock window associated with the first cylinder;
determining an engine knock background noise level via integrating output of a knock sensor during the engine knock window associated with the first cylinder; and
subtracting the base engine knock background noise level from the engine knock background noise level.

6. An engine operating method, comprising:
retarding a spark timing of a first cylinder via a controller in response to a request to learn a base engine knock background noise level;
adjusting a poppet valve timing of a second cylinder via the controller in response to the request to learn the base engine knock background noise level;
further adjusting the poppet valve timing of the second cylinder to open or close a poppet valve of the second cylinder during an engine knock window associated with the first cylinder via the controller after learning the base engine knock background noise level; and
determining a poppet valve opening or closing noise contribution to an engine knock background noise level that includes the base engine knock background noise level; and
determining a combined background noise level of the first cylinder.

7. The method of claim 6, further comprising determining an engine knock intensity level for a cylinder other than the first cylinder based on the base engine knock background noise level.

8. The method of claim 6, wherein determining the poppet valve opening or closing noise contribution to the engine knock background noise level that includes the base engine knock background noise level comprises:
integrating output of a knock sensor during the engine knock window associated with the first cylinder to determine the engine knock background noise level; and
subtracting the base engine knock background noise level from the engine knock background noise level.

9. The method of claim 6, wherein the combined background noise level of the first cylinder includes each of the base engine knock background noise level, the poppet valve opening or closing noise contribution to the engine knock background noise level, and a direct injection fuel injector background noise level.

\* \* \* \* \*